United States Patent [19]

McKernon et al.

[11] Patent Number: 4,706,512

[45] Date of Patent: Nov. 17, 1987

[54] ELECTRICALLY OPERABLE ACTUATOR

[75] Inventors: David A. McKernon; Lawrence A. North, both of Dunstable, England

[73] Assignee: Delco Products Overseas Corporation, Detroit, Mich.

[21] Appl. No.: 734,702

[22] Filed: May 16, 1985

[30] Foreign Application Priority Data

May 19, 1984 [GB] United Kingdom ............... 8412861

[51] Int. Cl.⁴ .................................................. F16H 57/00
[52] U.S. Cl. ........................................ 74/405; 74/411; 74/421 A; 74/625; 292/336.3
[58] Field of Search ............. 74/625, 405, 411, 89.17, 74/406, 421 R, 421 A, 422, 606 R; 292/201 R, 336.3, 347

[56] References Cited

U.S. PATENT DOCUMENTS

| | | | |
|---|---|---|---|
| 2,581,171 | 1/1952 | Carlson | 74/422 |
| 2,765,647 | 10/1956 | Carroll | 70/264 |
| 2,827,321 | 3/1958 | Leslie et al. | 292/5 |
| 2,876,652 | 3/1959 | Pankonin | 74/422 |
| 2,904,988 | 9/1959 | Gaida | 70/264 |
| 2,922,672 | 1/1960 | Van Voorhees | 292/11 |
| 3,030,794 | 4/1962 | Dyer et al. | 70/264 |
| 3,431,998 | 3/1969 | Martin | 180/112 |
| 3,612,207 | 10/1971 | Cabanes et al. | 180/112 |
| 3,653,237 | 4/1972 | Du Rocher | 70/264 |
| 3,717,954 | 2/1973 | Sheckells | 74/606 R |
| 3,954,016 | 5/1976 | Sarosy et al. | 74/422 |
| 4,135,377 | 1/1979 | Kleefeldt et al. | 70/264 |
| 4,269,440 | 5/1981 | Gelhard | 292/336.2 |
| 4,272,112 | 6/1981 | Schlick et al. | 292/201 |
| 4,290,634 | 9/1981 | Gelhard | 292/201 |
| 4,342,209 | 8/1982 | Kleefeldt | 70/264 |
| 4,364,249 | 12/1982 | Kleefeldt | 70/264 |
| 4,502,718 | 3/1985 | Sasaki et al. | 292/201 |
| 4,616,527 | 10/1986 | Frey et al. | 74/625 |

FOREIGN PATENT DOCUMENTS

| | | |
|---|---|---|
| 2847588 | 5/1980 | Fed. Rep. of Germany ... 292/336.3 |
| 621309 | 4/1949 | United Kingdom . |
| 772882 | 4/1957 | United Kingdom . |
| 1361247 | 7/1974 | United Kingdom . |
| 1481861 | 8/1977 | United Kingdom . |
| 1572102 | 7/1980 | United Kingdom . |

Primary Examiner—Lawrence J. Staab
Attorney, Agent, or Firm—Charles E. Leahy

[57] ABSTRACT

An electrically-operable actuator 10 which includes a reversible direct current electric motor 16, a reduction gear train and a reciprocable member 96 adapted at one end to be coupled, for example with a locking lever of a motor vehicle door latch has, in the reversible direct current electric motor 16, a permanent magnet stator 18 in the form of a cylindrical ring, the internal diameter of which is at least twice the actual length thereof; a coil-wound armature 24 in the form of a salient pole rotor having a diameter of at least twice the actual thickness thereof; and a flat disc-shaped segmented commutator secured to said rotor concentric with, and adjacent, a pinion output gear 40 on said rotor. In a preferred embodiment of the present invention, the actuator includes a rotary load-sensitive releasable coupling 64 within said reduction gear train which disengages said reciprocable member 96 completely from said reversible electric motor 16 at the end of each predetermined motorized movement of said reciprocable member 96, so that, when said reciprocable member 96 is coupled to said locking lever of a motor vehicle latch and the actuator 10 is inoperative, said locking lever can be operated manually without undue difficulty.

4 Claims, 3 Drawing Figures

ELECTRICALLY OPERABLE ACTUATOR

This invention relates to electrically-operable actuators for motor vehicles which include a reversible direct current electric motor, a reduction gear train and a reciprocable member adapted at one end to be coupled, for example, with a locking lever of a motor vehicle door latch, and, in particular, to such door lock actuators which also include a clutch means provided between said reversible electric motor and said reciprocable member.

It is customary in motor vehicles, particularly private motor vehicles, for one or more doors of the vehicle to be provided with door locks which have a manual release mechanism inside the vehicle and a key-operated mechanism accessible from outside of the vehicle. Many private motor vehicles are now being produced with centralised door locking systems, in which a key-operated mechanism accessible from outside the motor vehicle can be used to lock or unlock all of the doors of the vehicle substantially simultaneously. Such centralised door locking systems are based upon the concept of providing electrically-operable door lock actuators in all of the vehicle doors not mechanically connected to the key-operated mechanism, each of these door lock actuators being connected electrically to a control circuit including said key-operated mechanism.

One known form of centralised door lock actuator is one which includes a reversible direct current electric motor, a reduction gear train and a reciprocable member adapted at one end to be coupled with a locking lever of a motor vehicle door latch, there being a clutch means provided between said reversible electric motor and said reciprocable member so that manual operation of the locking lever of the motor vehicle door latch to which the actuator is coupled does not necessitate consequent rotation of the electric motor of the actuator. It will be appreciated that it is desirable to make such centralised door lock actuators as small and as compact as possible so that they do not take up too much space within the vehicle door. Consequently, there has been a tendency to employ in these known centralised door lock actuators a small, low power, high revolution electric motor to drive a multi-stage reduction gear train of high mechanical advantage. Such high revolution electric motors are those running at speeds of around 18,000 revolutions per minute. Consequently these actuators are inherently noisy in operation.

An electrically-operable actuator according to the present invention includes a reversible direct current electric motor, a reduction gear train and a reciprocable member adapted at one end to be coupled with a locking lever of a motor vehicle door latch, and is characterised in that said reversible direct current electric motor comprises: a permanent magnet stator in the form of a cylindrical ring, the internal diameter of which is at least twice the axial length thereof; a coil-wound armature in the form of a salient pole rotor having a diameter of at least twice the axial thickness thereof; and a flat disc-shaped segmented commutator secured to said rotor concentric with, and adjacent, a pinion output gear on said rotor. Such motor is capable of a high torque output at a relatively low speed of around 4,500 revolutions per minute, thus allowing the use of a reduction gear train of lesser mechanical advantage than displayed by known centralised door lock actuators.

Preferably said disc-shaped segmented commutator is secured to said rotor by being housed within a one-piece synthetic plastics moulding which includes said pinion output gear.

In a preferred embodiment of the present invention, in which there is a clutch means provided between said reversible electric motor and said reciprocable member, said clutch means is a rotary load-sensitive releasable coupling within said reduction gear train, which disengages said reciprocable member completely from said reversible electric motor at the end of each predetermined motorised movement of said reciprocable member, so that, when said reciprocable member is coupled to said locking lever of a motor vehicle door latch and the actuator is inoperative, said locking lever can be operated manually without undue difficulty.

Advantageously, the actuator includes a micro-switch actuable by movement of said reciprocable member, said micro-switch being utilised to switch on other similar door lock actuators housed in respective doors of the motor vehicle.

In one example of the preferred embodiment of the present invention, the reversible electric motor, gear train and reciprocable member are all housed in a common housing, and the rotary clutch is positioned within the gear train and comprises a driving member in the form of a toothed wheel pivotally mounted in said housing and having, on one side thereof, a radially-extending projection engagable with a radially-extending stop means within said housing, and, on the other side thereof, a spring-loaded radially-extending tooth aligned with said radially-extending projection; and a driven member in the form of a disc having, on one side, an output pinion and, on the other side, a depending annular skirt, said annular skirt co-axially engaging a bearing surface on said other side of said toothed wheel so as to enclose said spring-loaded tooth, there being a tooth-like projection on said depending annular skirt which is engagable with said spring-loaded tooth.

Advantageously, in this preferred example, interposed the radially-extending projection and the radially-extending stop means, there are resilient balls located between said one side of said toothed wheel and said housing, so as to cushion the shock experienced by the driving member of the rotary clutch when the driving member reaches the end of its operating movement.

The invention and how it may be performed are hereinafter particularly described with reference to the accompanying drawings, in which.

Figure 1:
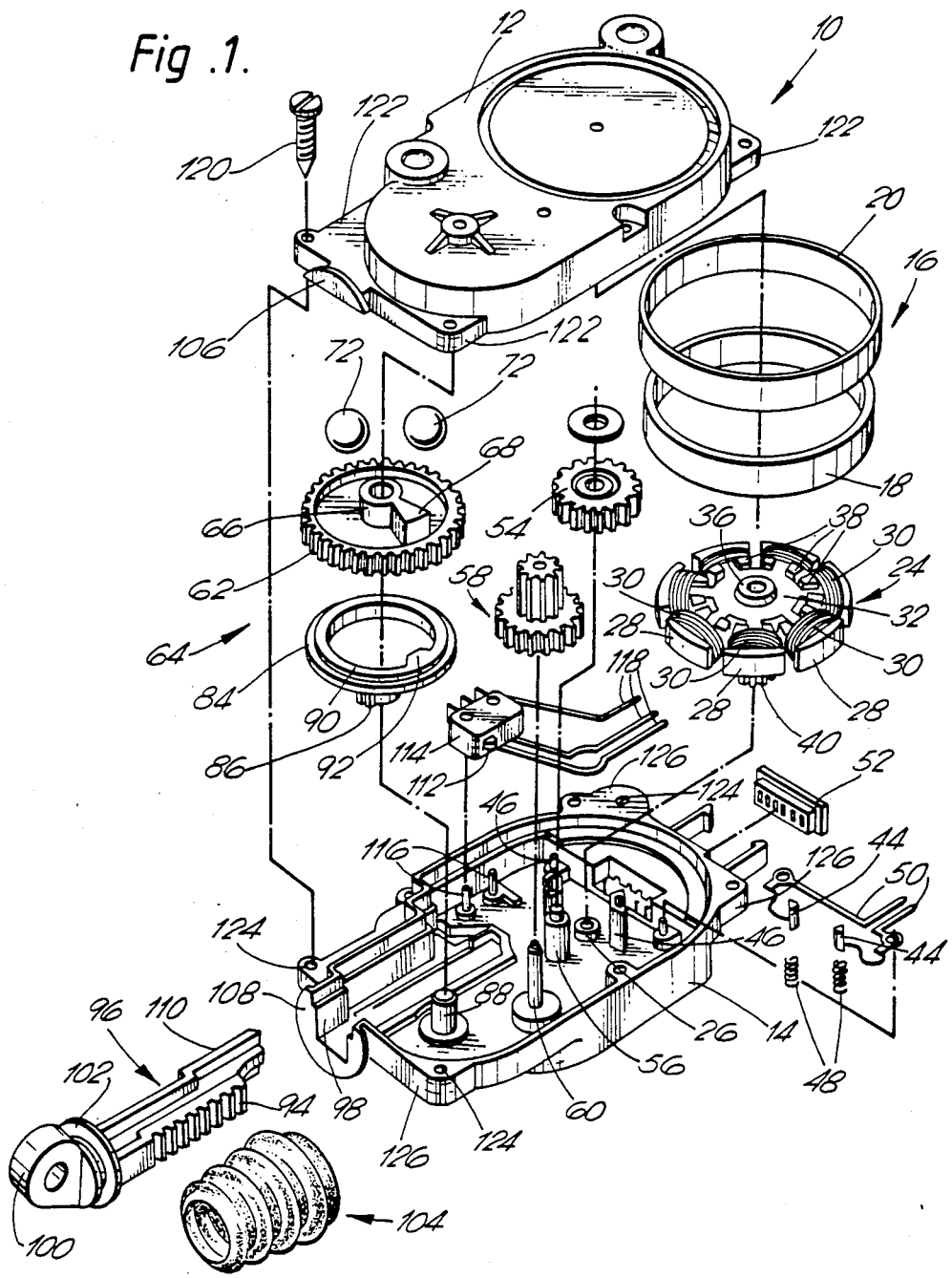
FIG. 1 is an exploded, isometric view of a centralised door lock actuator according to a preferred embodiment of the present invention.

As can be seen in FIG. 1 of the drawings, the centralised door lock actuator 10 according to the present invention comprises a moulded housing of synthetic plastics material formed in two interengaging sections 12, 14, the upper housing section 12 housing a permanent magnet stator 16 in the form of a cylindrical composite ring made up of a permanent magnet inner ring 18 and a steel outer ring 20, said steel outer ring 20 fitting within a corresponding cylindrical bore within the upper section 12 of the housing. The internal diameter of the permanent magnet inner ring 18 is at least twice the axial length of this inner ring 18, and, in this particular embodiment of the invention, the internal diameter of the permanent magnet inner ring 18 is three times the axial length of the ring. Mounted coaxially within the cylindrical bore in the upper section 12 is a steel shaft 22 on which is rotatably mounted a coil-wound armature 24. The free end of the steel shaft 22 locates in a bushing 26 in the lower section 14 of the housing when the upper section 12 is located in position upon the lower section 14.

Figure 2:
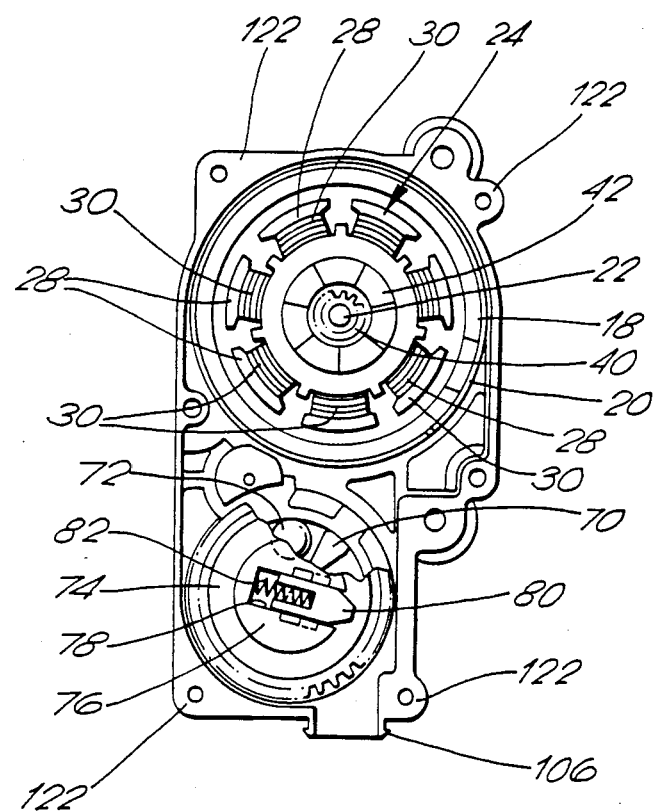
FIG. 2 is a view of an upper portion of the actuator shown in FIG. 1, with the components in position.

The coil-wound armature 24 is in the form of a salient pole rotor having seven pole sections 28, each of which is provided with a coil winding 30. Each pole section 28 is made of steel and extends from an inner ring 32, also of steel. Concentric with this inner ring 32 is a synthetic plastics moulding 34 in the shape of a disc carrying on one side thereof a moulded central bushing 36 for the armature shaft 22 and seven bifurcated legs 38, each of which locks into position over a respective one of said pole sections 28. On the other side of the synthetic plastics moulding 34 is a coaxial integral pinion output gear 40, through which extends the free end of the armature shaft 22. As can be seen in FIG. 2 of the drawings, the other side of the synthetics plastics moulding 34 also houses an annular disc-shaped segmented commutator 42 which is concentric with the pinion output gear 40. Both the armature 24 and the integral pinion output gear 40 are free to rotate upon the armature shaft 22. Electric current is fed to the armature 24 through two carbon brushes 44, each of which is slidably mounted in a respective integrally moulded brush holder 46 in the lower section 14 of the housing, and is spring-biased into contact with the segmented commutator 42 by means of a respective coil spring 48. Each carbon brush 44 is electrically connected to a respective terminal pin 50 which extends through the end of the lower section 14 of the housing and through a respective slot in a rubber grommet 52 which serves to isolate the interior of the housing of the actuator 10 from the ingress of dust and moisture.

The integral pinion 40 of the armature 24 meshes with a gear wheel 54 which is rotatably mounted upon an upstanding steel shaft 56 insert-moulded in the lower section 14 of the housing. Gear wheel 54 also meshes with a gear wheel portion of a combined gear wheel and pinion 58 which is rotatably mounted upon a shaft 60 mounted within the lower section 14 of the housing. The pinion portion of the combined gear wheel and pinion 58 meshes with a toothed wheel 62 which forms a driving member of a rotary clutch 64. Toothed wheel 62 has on one side thereof an integral concentric bushing 66 from which extends a radial projection 68. Toothed wheel 62 is pivotally mounted upon a stub axle (not shown) which is integrally moulded into the base of the upper section 12 of the housing. A radially extending stop means 70 (see FIG. 2) is formed in the base of the upper section 12 of the housing, and two balls 72 of resilient rubber are positioned between the toothed wheel 62 and the base of the upper section 12 of the housing so that the balls 72 lie either side of the radial projection 68.

As can be seen in FIG. 2, the other side of the toothed wheel 62 has formed therein an annular channel 74 encircling a central boss 76, which central boss includes a radially-extending channel 78 in which is slidably mounted a radially-extending tooth 80. The radially-extending tooth 80 is spring-biased towards the periphery of toothed wheel 62 by means of a coil spring 82.

Toothed wheel 62 engages with a driven member of the clutch 64 in the form of an integrally moulded disc 84 having moulded on one side thereof a co-axial bushing 86, the major proportion of the periphery of which is provided with gear teeth. The disc 84 is pivotally mounted upon the lower section 14 of the housing by the engagement of this bushing upon a stub axle 88 extending from the base of the lower section 14. The other side of the disc 84 is provided with a depending annular skirt 90, the external diameter of which is such that the annular skirt 90 is a sliding fit within the annular channel 74 of toothed wheel 62. There is a tooth-like projection 92 on the annular skirt 90 which radially extends towards the centre of disc 84. This tooth-like projection 92 is dimensioned to be engagable with the tip of the spring-loaded radially-extending tooth 80 on toothed wheel 62.

Figure 3:
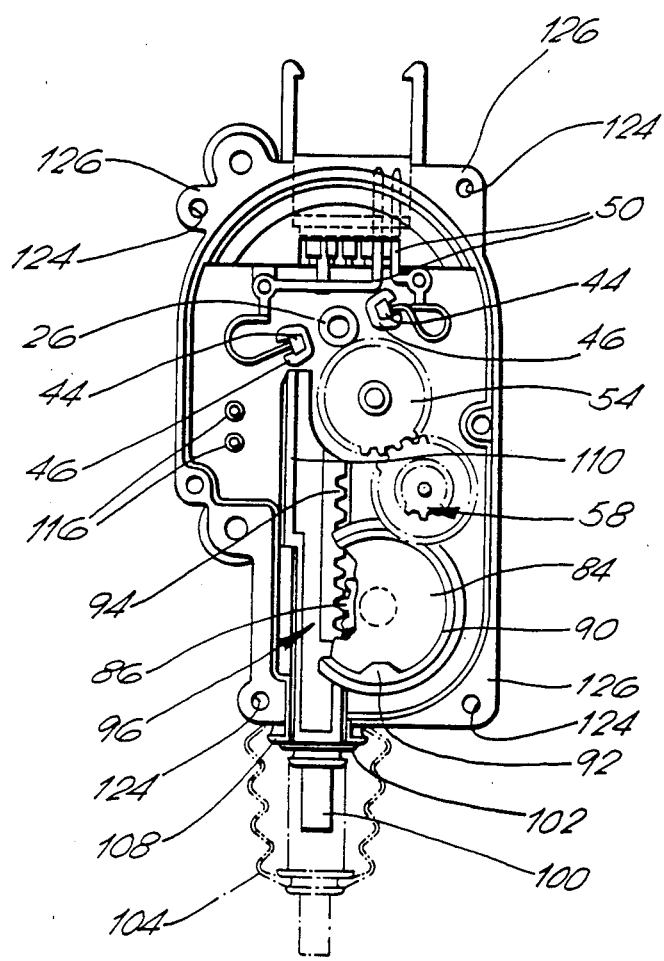
FIG. 3 shows a similar view of a lower portion of the actuator shown in FIG. 1, with some parts removed for clarity.

As can be seen in FIG. 3 of the drawings, the external gear teeth on the co-axial bushing 86 of disc 84 engage with a toothed rack 94 formed on an output member 96 which is slidably mounted within a channel-shaped recess 98 formed in the lower section 14 of the housing. Thus the output member 96 can reciprocate within the channel-shaped recess 98 in response to oscillatory motion of the disc 84 and co-axial bushing 86. One end of output member 96 is provided with an apertured lug 100 which serves as a means of coupling the output member 96 to a locking lever of a motor vehicle door latch. Adjacent the apertured lug 100 is a collar 102 formed on the output member 96, which collar 102 engages in one end of a hollow cylindrical corrugated resilient sealing member 104, the other end of which locates over collar-shaped projections 106 and 108 provided respectively on the ends of upper section 12 and lower section 14 of the housing. The sealing member 104 prevents the ingress of dust and moisture into the housing of the actuator 10, and its resiliency is such as not materially to impede the reciprocation of output member 96 within the channel-shaped recess 98.

The other end of the output member 96 is provided with a stepped configuration 110, which stepped configuration 110 is engagable with a switch element 112 of a micro-switch 114 when the output member 96 is retracted within the housing. Micro-switch 114 is mounted within the lower section 14 of the housing upon upstanding pins 116 located in lower section 14. Terminals 118 of the micro-switch 114 extend through the end of the lower section 14 and through respective apertures in the grommet 52 for connection with control circuitry associated with the actuator 10.

The upper section 12 and the lower section 14 of the housing of the actuator 10 are releasably engaged one with the other by means of self-tapping screws 120 which pass through respective apertured lugs 122 formed on the upper section 12 and engage with bores 124 formed in similar-lugs 126 formed on lower section 14.

The operation of the actuator shown in FIGS. 1 to 3 will now be described on the basis that the actuator 10 is installed in a centralised locking system in a motor vehicle in which the door latches of the vehicle are provided with locking levers which can also be actuated manually by occupants of the vehicle. Thus the output member 96 of the actuator 10 would be coupled to such a locking lever which can also be manually operated by an occupant of the motor vehicle. The terminals 50 of the actuator 10 are coupled into an electrical circuit within the motor vehicle, which electrical circuit is actuated by a key-operated mechanism situated in either the driver's door or, optionally, the other front door of the motor vehicle, said circuit including a timing means which governs the length of time that electrical power can be supplied to terminals 50 upon actuation of the key-operated mechanism in the door of the vehicle.

Assume now that the vehicle door latch connected to the operating member 96 of the actuator 10 is in an unlocked condition, and that a key has been inserted in the key-operated mechanism in the vehicle door and turned to lock the vehicle door latch. When this occurs, the electric circuit associated with the actuator 10 is actuated to supply electrical power of the correct polarity to terminals 50 of the actuator 10, and armature 24 commences to rotate in the predetermined direction to cause locking of the vehicle door latch. Although electric motor 16 is an extremely compact design, it is capable of developing a high torque output at a relatively low speed of about 4,500 revolutions per minute. The pinion output gear 40 on armature 24 rotates gear wheel 54 and the combined gear wheel and pinion 58, thus commencing to turn toothed wheel 62. The mechanical ratio displayed by this train of gear wheels is such that approximately 8 revolutions of armature 24 will produce 1 revolution of toothed wheel 62.

Toothed wheel 62, however, cannot complete a full revolution, since it is prevented from doing so by the engagement between radial projection 68 and radially-extending stop means 70 in upper section 12, through the intervening resilient rubber ball 72. When armature 24 first commences to rotate, one side of the radial projection 68 is already in contact with one side of the radially-extending stop means through the intervening resilient rubber ball 72. Movement of toothed wheel 62 in response to the rotation of armature 24 moves the radial projection 68 away from the radially-extending stop means 70, and the toothed wheel 62 commences to rotate until the other side of radial projection 68 comes into contact, through the other resilient rubber ball 72, with the other side of the radially-extending stop means 70. Consequently, toothed wheel 62 can only rotate through a predetermined angle of rotation which is always less than 360°.

At the commencement of movement of toothed wheel 62, one side of the radially-extending tooth 80 on toothed wheel 62 is in contact with one side of the tooth-like projection 92 on disc 84. Consequently, upon movement of toothed wheel 62, disc 84 becomes entrained with toothed wheel 62 and commences to move in the same direction. At the commencement of movement of disc 84, the output member 96 is extended as far from the housing of the actuator 10 as is required to keep an associated locking lever of the motor vehicle door latch to which the actuator 10 is coupled in the unlocked position for the door latch. Upon the commencement of movement of the disc 84, the simultaneous movement of the gear teeth on co-axial bushing 86 and the engagement thereof with the toothed rack 94 on output member 96 commences to retract output member 96 within the housing of the actuator 10. This movement, in turn, causes the corresponding movement of the associated locking lever to cause the motor vehicle door latch to go to a locked condition.

The associated locking lever reaches the end of its travel to place the vehicle door latch into a locked condition before toothed wheel 62 reaches the end of its travel. Consequently further inward movement of the output member 96 is blocked, and, due to the positive engagement of the gear teeth on co-axial bushing 86 with the corresponding gear teeth on the toothed rack 94, the disc 84 becomes stationary. When this occurs, the continuing motion of the toothed wheel 62 presses the spring loaded radially-extending tooth 80 harder against the now-stationary tooth-like projection 92. Both the radially-extending tooth 80 and the tooth-like projection 92 are provided with similarly shaped sloping cam surfaces, and the increasing load exerted on the tooth-like projection 92 by the radially-extending tooth 80 becomes sufficient to cause the radially-extending tooth 80 to retract within the radially-extending channel 78 against the spring-bias of the coil spring 82 until the tip of the radially-extending tooth 80 is freed from the tip of the tooth-like projection 92. Once this occurs, toothed wheel 62 is free to continue its travel until the other side of radial projection 68 comes into contact, through resilient rubber ball 72, with the other side of the radially-extending stop means 70. When this occurs, toothed wheel 62 ceases to move, and the armature 24 is brought to rest. Shortly after this occurs, the timing means in the electric circuit associated with the actuator 10 switches off the supply of electrical power to the terminals 50, thus de-actuating the reversible electric motor 16. The door latch associated with the actuator 10 is now in a locked condition, and the actuator 10 is de-activated.

Consider now that an occupant of the motor vehicle may now decide to unlock the vehicle door latch by means of manually operating the locking lever associated with the output member 96. Movement of this associated locking lever to do this will result in a force being applied to the output member 96 to withdraw it from the housing of the actuator 10. Due to the positive engagement between the toothed rack 94 on output member 96 and the gear teeth on the co-axial bushing 86 of disc 84, this outward movement of the output member 96 will cause movement of disc 84 in the opposite direction to that in which it was moved by the toothed wheel 62. Since, during the operation of the actuator 10, the radially-extending tooth 80 passed over the tooth-like projection 92, they are no longer in contact, and disc 84 is thus free to move. Disc 84 can continue to move freely until the manual operation of the locking lever has been completed. Thus throughout this movement the occupant of the vehicle has not had to apply any substantial effort to unlocking the door latch mechanism over and above the normal effort required to move the operating components of the door latch assembly themselves. When the manual operation of unlocking the door latch ceases, the tooth-like projection 92 is positioned adjacent to the radially-extending tooth 80, but not in contact with it. Consequently, at no time during manual actuation of the locking lever is there any direct mechanical engagement between tooth-like projection 92 and radially-extending tooth 80. It will be clearly understood, of course, that, if the occupant so desires, the door latch mechanism can be returned to its locked state from its unlocked state by manual operation without undue difficulty by an occupant of the motor vehicle, since the rotary clutch 64 remains disengaged all the time the electric motor 16 is de-activated.

If the key in the key-operated mechanism is now turned so as to signal for movement of the door latch mechanism from its locked position to its unlocked position, electrical power is supplied to the terminals 50 to cause the armature 24 of electric motor 16 to revolve in the reverse direction. This, in turn, commences to turn the toothed wheel 62 in the opposite direction, so bringing the radially-extending tooth 80 into contact with the tooth-like projection 92 to cause the entrainment of disc 84 and the subsequent movement of output member 96 outwardly from the housing of the actuator 10. This movement of the output member 96 will continue until the vehicle door latch has moved to its unlocked position, and then output member 96 will come to a halt, thus holding disc 84 stationary. Once again, toothed wheel 62 will continue to move, causing the spring-biased radially-extending tooth 80 to ride over the tooth-like projection 92 to allow the toothed wheel 62 to move to the end of its travel. Once again, the toothed wheel 62 reaches the end of its travel shortly before the time delay portion of the electric circuit associated with the actuator 10 cuts off the supply of electric power to the electric motor 16. It will be appreciated, of course, that if an occupant of the vehicle has previously unlocked the door latch mechanism, then entrainment of the disc 84 by engagement of the radially-extending tooth 80 with the tooth-like projection 92 does not occur until the point is reached at which the radially-extending tooth 80 is due to override the tooth-like projection 92. Thus, in effect, when the door latch is in the unlocked condition, the radially-extending tooth 80 moves away from one side of the tooth-like projection 92 around the circumference of the annular skirt 90 until it comes into contact with the other side of the tooth-like projection 92. Once this occurs, the increasing load exerted on the radially-extending tooth 80 by the movement of toothed wheel 62 causes the radially-extending tooth 80 to override the tooth-like projection 92, and thus release the clutch 64. Moreover, it will be realised that, with the door latch in the unlocked condition and the actuator 10 de-activated, an occupant of the motor vehicle can, again, manually operate the mechanism of the door latch freely without hindrance from the actuator 10.

The actuator 10 shown in FIGS. 1 to 3 is a master actuator, for use in centralised door locking systems in which it is possible to lock and unlock all of the door latch mechanisms through key-operated mechanisms located in both the driver's door and the other front door of the motor vehicle. Thus this actuator 10 includes the micro-switch 114, the switching element 112 of which is actuated by contact with the stepped configuration 110 of the output member 96 when that output member 96 retracts into the housing of the actuator 10. The micro-switch 114, when so actuated, then switches on other centralised door actuators of the same type located in the other doors of the vehicle, the actuators in the rear doors of the motor vehicle being of the same construction, but omitting the micro-switch 114. Manual operation of an actuator 10 as shown in the drawings will result in all of the door latch mechanisms being operated together, due to the switching action of the micro-switch 114. The actuators employed in the rear doors of the vehicle, since they do not incorporate such a micro-switch 114, will not produce such a centralised door-locking action when either of the door latches in the rear doors of the vehicle are manually locked or unlocked.

It will be understood from the preceding description that the angular extent to which the disc 84 can be turned is a predetermined amount less than the angular distance through which the toothed wheel 62 is moved during the actuation of the electric motor 16, so as to ensure that the radially-extending tooth 80 overrides the tooth-like projection 92 before the toothed wheel 62 reaches the end of its travel in either direction. In the embodiment as described, this limitation of angular movement of disc 84 is produced by the extent of travel of the locking lever of the associated door latch. The output member 96, however, is provided with its own integral stop means adjacent either end thereof, which integral stop means are engagable with similar stop means positioned within the lower section 14 of the housing to produce a maximum stroke of the output member 96. In practice, this maximum output stroke of output member 96 exceeds the distance through which the locking lever of the associated door latch has to move in order to move the door latch mechanism from a locked to unlocked state, and vice-versa. It will be understood that the provision of this maximum stroke to the output member 96 ensures that the centralised door lock actuator can be used to operate a variety of commercially available motor vehicle door latches.

The actuator of the present invention is a compact yet effective centralised actuator which operates smoothly, rapidly and quietly to move, for example, an associated vehicle door latch mechanism from either a locked position to an unlocked position, or from an unlocked position to a locked position. The shape and design of the reversible electric motor used in the actuator is such as to provide a very slim actuator having a high power output which is delivered with minimal noise. In a preferred embodiment of the present invention, the actuator is provided with a rotary clutch mechanism which is effectively completely disconnected at the end of each power stroke of the actuator, thus enabling the associated vehicle door latch mechanism to be locked or unlocked manually without any undue difficulty by an occupant of the motor vehicle in which the actuator is installed. In this preferred embodiment, the rotary clutch mechanism is provided with resilient balls between the driving member and the clutch housing to effectively cushion the clutch mechanism against the forces generated between the driving member and the clutch housing when the driving member reaches the end of its travel.

In the actuator according to a preferred embodiment of the present invention, the design of the actuator is such that the actuator can be readily adapted to serve both as a master actuator for a centralised locking system and as a slave actuator for such a system, merely by excluding certain components from the actuator. Moreover, the total operating stroke of the output member of the actuator is such as to encompass the range of movement of locking levers of the motor vehicle door latches available commercially. Consequently the operation of the actuator can compensate for minor misalignments between the output member of the actuator and an associated door latch during assembly thereof within a motor vehicle door.

The actuator of the present invention has been particularly described for use with a motor vehicle door latch mechanism. It will be understood, however, that the basic actuator has potentially wider use within a motor vehicle for electrically-actuating other movable components within a motor vehicle such as, for example, ventilation louvres in an air-conditioning system, a petrol fuel filler cap latch, or a bonnet-release latch. Consequently the scope of protection sought for the actuator of the present invention is defined by the scope of the claims of this application.

We claim:

1. An electrically-operable actuator for a motor vehicle, which includes a housing, a reversible direct current electric motor, a reduction gear train, a reciprocable member adapted at one end to be coupled with a locking lever of a motor vehicle door latch and clutch means provided between said reversible electric motor and said reciprocable member, characterised in that said clutch means is a rotary load-sensitive releasable coupling within said reduction gear train which disengages said reciprocable member completely from said reversible electric motor at the end of each predetermined motorised movement of said reciprocable member, said rotary clutch having a driving member in the form of a toothed wheel pivotally mounted in said housing and having, on one side thereof, a radially-extending projection engageable with a radially-extending stop means within said housing, and, on the other side thereof, a spring-loaded radially-extending tooth aligned with said radially-extending projection; and a driven member in the form of a disc having, on one side, an output pinion operably associated with the reciprocable member and, on the other side, a depending annular skirt, said annular skirt co-axially engaging a bearing surface on said other side of said toothed wheel so as to enclose said spring-loaded tooth, there being a tooth-like projection on said depending annular skirt which is engageable with said spring-loaded tooth.

2. An electrically-operable actuator according to claim 1, characterised in that, interposed the radially-extending projection and the radially-extending stop means, there are resilient balls located between said one side of said toothed wheel and said housing.

3. An electrically-operable actuator according to claim 2, characterised in that the reciprocable member forms a rack portion of a rack and pinion section of the gear train, the output pinion on the driven member of rocable member forms a rack portion of a rack and pinion section of the gear train, the output pinion on the driven member of the rotary clutch forms the pinion portion of said rack and pinion section.

4. An electrically-operable actuator according to claim 3, characterised in that the actuator includes a micro-switch actuable by movement of said reciprocable member.

* * * * *